United States Patent [19]

Tanaka et al.

[11] Patent Number: 5,165,619
[45] Date of Patent: Nov. 24, 1992

[54] METHOD OF ACCOMMODATING PHOTOGRAPHIC FILM WITH ELONGATED LEADER MEMBER IN PHOTOGRAPHIC-FILM CARTRIDGE

[75] Inventors: Katsuhiko Tanaka; Junichi Tsuji, both of Kanagawa, Japan

[73] Assignee: Fuji Photo Film Co., Ltd., Kanagawa, Japan

[21] Appl. No.: 721,003

[22] Filed: Jun. 27, 1991

[30] Foreign Application Priority Data

Sep. 14, 1990 [JP] Japan ................................. 2-244845

[51] Int. Cl.⁵ ...................... B65H 18/08; B65H 18/00
[52] U.S. Cl. ............................ 242/71.1; 242/67.1 R; 242/71.7
[58] Field of Search .................... 242/71.1, 71.2, 71.6, 242/71.7, 55, 67.1 R, 67.3 R

[56] References Cited

U.S. PATENT DOCUMENTS 3,049,312  8/1962  Simjian ........................ 242/67.3 R
3,191,882  6/1965  Riedel ......................... 242/67.3 R
3,743,200  7/1973  Hommerin ..................... 242/71.7

FOREIGN PATENT DOCUMENTS

WO90/04205  4/1990  World Int. Prop. O.
WO90/04212  4/1990  World Int. Prop. O.

Primary Examiner—Daniel P. Stodola
Assistant Examiner—John Q. Nguyen
Attorney, Agent, or Firm—Sughrue, Mion, Zinn, Macpeak & Seas

[57] ABSTRACT

A method of accommodating a roll of photographic film in a main body of a photographic-film cartridge in which the cartridge is in a state in which one end of an elongated leader member is brought into engagement with a spool in the cartridge and a predetermined length of the other end thereof extends out of the cartridge includes a first step of inserting the leading end of a roll of photographic film into the main body of the cartridge, a second step of rotating the spool and feeding the roll of photographic film into the main body of the cartridge so as to wind the leader member and the leading end of the photographic film onto the spool, and a third step of rotating the spool so as to wind the rest of the roll of photographic film onto the spool, thereby accommodating the photographic film thus wound in the main body of the cartridge.

A developed photographic film can be easily accommodated in the cartridge by making use of the frictional force produced by winding the leader member and the roll of photographic film together on the spool.

8 Claims, 9 Drawing Sheets

METHOD OF ACCOMMODATING PHOTOGRAPHIC FILM WITH ELONGATED LEADER MEMBER IN PHOTOGRAPHIC-FILM CARTRIDGE

BACKGROUND OF THE INVENTION

1. Field of the Invention

The present invention relates to a method of accommodating a detached and developed roll of photographic film in a main body of a photographic-film cartridge.

2. Description of the Related Art

Each of the kinds of photographic film used for cameras which are now on the market is accommodated in a main body of a photographic-film cartridge or a photographic-film case, in a state in which it is wound on a spool.

When it is desired to perform the process of the development of such photographic film, the film is detached from the cartridge and then subjected to a development process.

The photographic film (negative film), which has been so processed, is cut every predetermined number of frames, and each strip of film thus cut is held in a so-called negative sheet after which it is returned to the orderer. Therefore, a used photographic-film cartridge is of no use, and it is necessary to perform cumbersome work such as cutting the photographic film every predetermined number of frames, accommodating each strip of film thus cut in the negative sheet, etc.

On the other hand, there has recently been proposed a photographic film for use in a camera, which has a magnetic recording area formed thereon where photographic film information about the type of photographic film or the like, order information about the number of photographic prints to be made or the like, and user information about the names of the orderers or the like can be recorded.

However, when photographic film with such a magnetic recording area is cut every predetermined number of frames and then accommodated in the negative sheet, as in the prior art, the magnetic recording area on the photographic film is divided into many parts, and hence a series of items of information magnetically recorded on the magnetic recording area is divided into parts. It is therefore considered that such information cannot be easily read by a magnetic recording reader.

In order to avoid the difficulty of reading such information, there has been proposed a method of accommodating photographic film after development thereof, wherein the original film cartridge (from which the photographic film has been withdrawn and cut off prior to development) is re-utilized, or, alternatively, wherein a specially-prepared cartridge for accommodating photographic film after it has been developed is used. In either case, the developed film is inserted into the cartridge and wound onto a spool therein after which it is returned to the orderer who has requested its development.

However, this method creates a serious difficulty in that, in the case of re-utilizing a cartridge the photographic film must be cut from the spool contained in the main body of the cartridge and, in either case, the developed photographic film must be inserted and wound onto the spool inside the cartridge.

SUMMARY OF THE INVENTION

With the foregoing in view, it is a principal object of the present invention to provide a method of accommodating photographic film in a photographic-film cartridge, by which a roll of photographic film which has been subjected to a development process can be easily accommodated in a main body of the cartridge.

According to a first aspect of the present invention, there is provided a method of accommodating a roll of photographic film in a main body of a photographic-film cartridge with the cartridge being in a state in which one end of an elongated leader member is mounted on a spool in the cartridge and a predetermined length of the other end thereof extends out of the cartridge, the method comprising the following three steps, i.e., a first step of inserting the end of a roll of photographic film into the main body of the cartridge through a photographic-film outlet defined in the cartridge; a second step of rotating the spool and feeding the roll of photographic film into the main body of the cartridge, during which the so-situated leader member serves as a guide member, until the leading end of the roll of photographic film is held by the leader member or by the leader member and the spool; and a third step of rotating the spool so as to wind the roll of photographic film onto the spool with the aid of a frictional force produced between the photographic film and the leader member when the leading end of the roll of developed photographic film is held between loops of the leader member wrapped around the spool, or, by aid of another frictional force produced when the leading end of the roll of developed photographic film is held between a loop of the leader member and the spool, thereby accommodating the roll of photographic film in the main body of the cartridge.

According to a second aspect of the present invention, there is provided a method of accommodating a roll of photographic film in a main body of a photographic-film cartridge in a state in which one end of an elongated leader member is mounted on a spool in the cartridge and a predetermined length of the other end thereof extends out of the cartridge, and at least one longitudinally oriented slit is made in the leader member, starting at the extended tip end of the leader member and having a predetermined length. This method comprises the following three steps, i.e., a first step of inserting the end of the roll of developed photographic film into the cartridge through a photographic-film outlet defined in the cartridge, while the leading end of the roll of photographic film is being held by respective parts of the leader member divided by said at least one slit; a second step of rotating the spool and feeding the roll of photographic film into the main body of the cartridge, during which the leader member serves as a guide member, until the leading end of each section of the roll of photographic film held by the respective parts of the leader member is held on said spool by each subsequent section of the roll of photographic film held by its associated part of the leader member and by the spool; and a third step of rotating the spool so as to wind the photographic film onto the spool with the aid of the frictional force produced when the leading end of each section of the photographic film is held by subsequent sections of the photographic film, and by the leader member and the spool, thereby accommodating the roll of photographic film in the main body of the cartridge.

According to the first aspect of the present invention, when it is desired to perform the process of development of a roll of exposed photographic film wound onto a spool and accommodated in the main body of a film cartridge, the roll of exposed photographic film is first withdrawn from the cartridge and cut off at such a point as to leave a predetermined length of the leader member of the roll of film extending from the main body of the cartridge. Thus, after developing, upon re-accommodation of the photographic film in the main body of the same original film cartridge from which it was removed for developing, when one end of the photographic film which has been thus cut and subjected to a development process is inserted into a photographic-film withdrawal slot or outlet defined in the main body of the cartridge so as to be wound on the spool therein, the already-developed photographic film can be easily accommodated in the main body of the cartridge by making use of the frictional force produced between the leader member which was left behind when the unprocessed roll of film was cut off for processing, and the roll of developed photographic film.

Alternatively, a new cartridge having a leader member arranged as above may be specially prepared for accommodation of the roll of photographic film, instead of the original cartridge.

According to the second aspect of the present invention, when it is desired to carry out the process of development of a roll of exposed photographic film wound on a spool and contained in the main body of a film cartridge, the exposed roll of photographic film is first withdrawn from the cartridge and cut at such a point as to leave a predetermined length of the leader member of the roll of film extending from the main body of the cartridge, and at least one longitudinally extending slit having a predetermined length is made in the protruding end of the remaining leader member (along the direction in which the leader member is wound on the spool). Thus, upon re-accommodation of the photographic film in the main body of the same cartridge, when one end of the roll of photographic film thus cut and developed is held between respective parts of the leader member divided by such (a) slit (s), and then wound on the spool, the thus-developed photographic film can be easily accommodated in the main body of the cartridge by making use of the frictional force produced between the left behind leader member and the roll of developed photographic film.

Alternatively, a new cartridge having a leader member arranged as above may be specially prepared for accommodation of the roll of photographic film, instead of the original cartridge.

The present invention can bring about a superb effect in that when the photographic film is accommodated in the cartridge body in accordance with the above method, the developed photographic film can be easily inserted and contained in the cartridge body. Further, since the leader member is not adhered to the photographic film with adhesive, the photographic film can be prevented from being subjected to flaws due to damage produced (for example) by rubbing of the splice by means of which the photographic film and the leader member are stuck to each other, against the inner wall of the cartridge during the process of insertion and winding of the roll of photographic film in the cartridge for re-accommodation therein.

The above and other objects, features and advantages of the present invention will become apparent from the following description and the appended claims, taken in conjunction with the accompanying drawings in which preferred embodiments of the present invention are shown by way of illustrative examples.

DETAILED DESCRIPTION OF THE PREFERRED EMBODIMENTS

A first embodiment of a first aspect of the present invention will hereinafter be described with reference to FIGS. 1 through 5.

Figure 1:
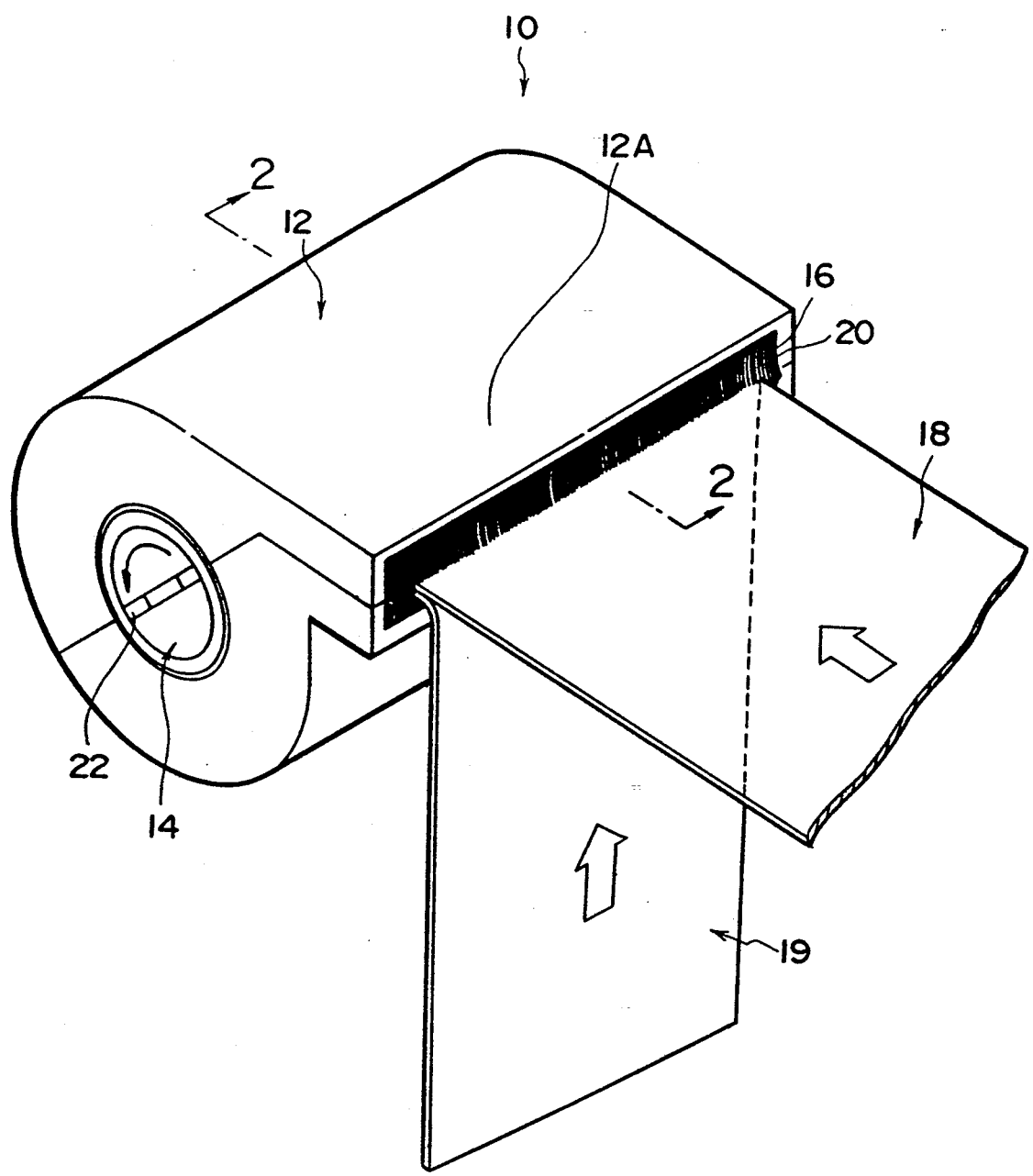
FIG. 1 is a view for describing a method of accommodating a photographic film in a photographic-film cartridge according to a first embodiment of a first aspect of the present invention.

As shown in FIG. 1, a photographic-film cartridge 10 comprises a cartridge body 12 which forms a case for accommodating a photographic film therein and is shaped substantially in the form of a cylinder, and a spool 14 rotatably supported in the cartridge body 12 and used to wind a photographic film thereon.

The cartridge body 12 has on its outer peripheral surface a substantially-rectangular extending portion plush 12A which functions as a shading member 12A extending in the direction of the length thereof along its axial dimension. The plush 12A which functions as a shading member 12A has a slot 16 defined in an end thereof. The slot 16 is shaped in the form of a rectangle the lengthwise dimension of which is defined along the axial dimension of the cartridge body 12, and which enables a photographic film to pass therethrough. In addition, the slot 16 has a light-screening cloth 20 which adheres thereto, for preventing light from entering the cartridge body 12. Filling up a gap defined between the photographic film and the slot 16 with the light-screening cloth 20 prevents the light from being transmitted through the cartridge body 12.

Figure 2:
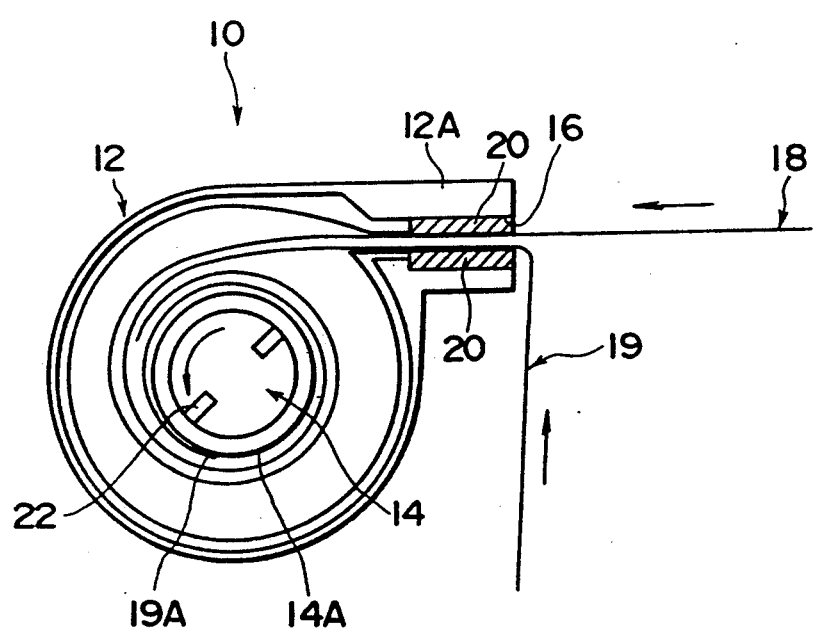
FIG. 2 is a schematic cross-sectional view taken along line 2—2 of FIG. 1.

As shown in FIG. 2, the spool 14 has an outer peripheral surface 14A thereof on which one of the two ends of a leader 19 is mounted, this leader having been previously separated from a roll of exposed, undeveloped photographic film by cutting the roll of film therefrom in order to subject the roll of film to a development process. Alternatively, a new cartridge having an installed leader member may be especially prepared. The spool 14 has pawls 22 provided at both axial ends thereof. When the pawls 22 are rotated in a photographic-film winding direction (in a counterclockwise direction as seen in FIG. 2), the leader 19 is wound up on the spool 14 so as to be accommodated in the cartridge body 12.

One example of a photographic-film winding device in which the present invention is employed will hereinafter be described with reference to FIGS. 3 through 5.

Figure 3:
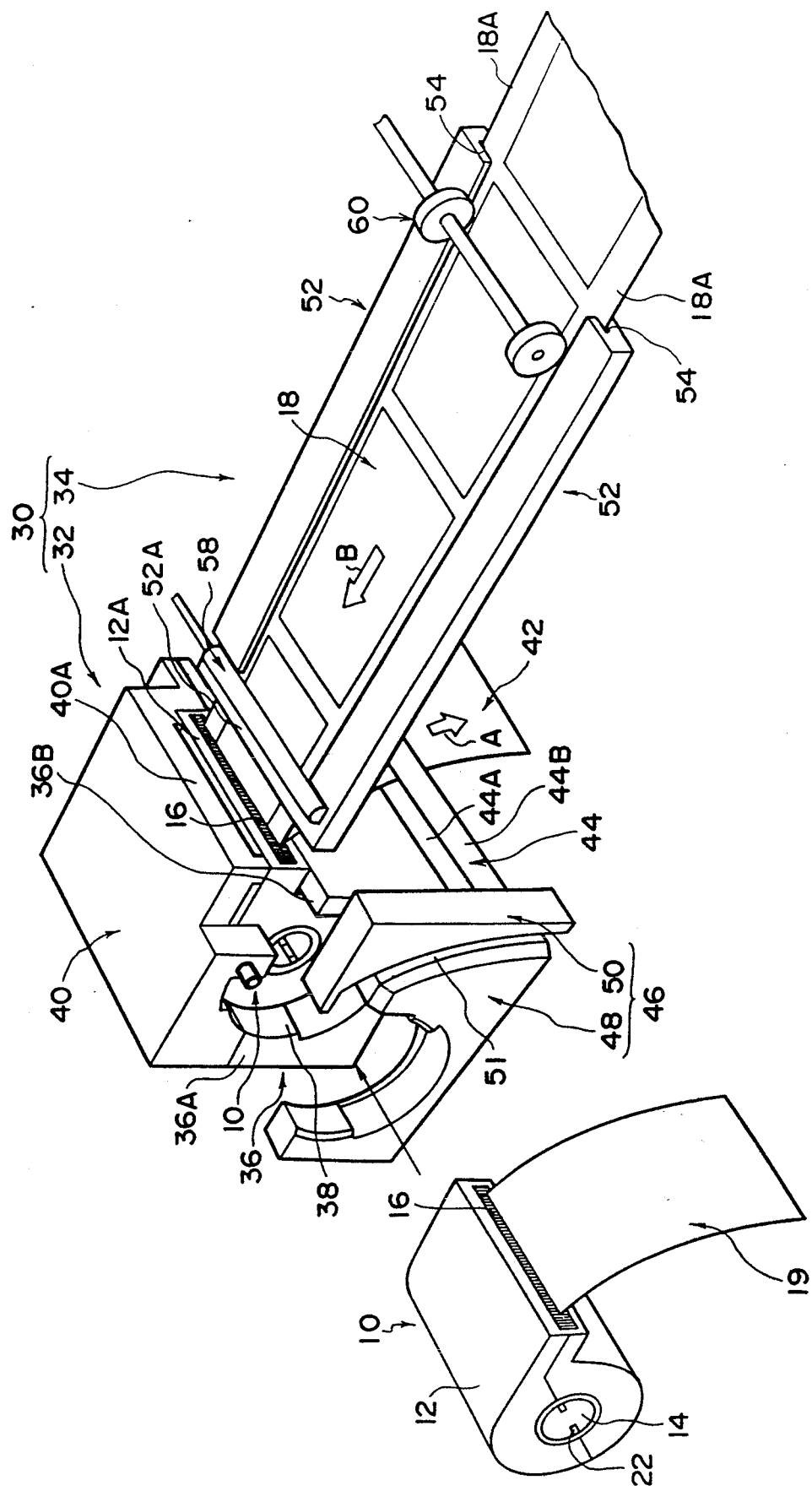
FIG. 3 is a perspective view showing a photographic-film winding device to which is applied a method of accommodating the photographic film in the cartridge according to the first embodiment of the first aspect of the present invention.

As shown in FIG. 3, a photographic-film winding device 30 comprises a cartridge case unit 32 for anchoring and containing the photographic-film cartridge 10, and a feed guide unit 34 for winding up a photographic film into the cartridge 10.

A cartridge case 36, which forms a part of the cartridge case unit 32, is shaped in the form of a box, and has a substantially-cylindrical concave portion 38 defined therein for accommodating the cartridge 10 in a state in which it lies on its side. The concave portion 38 has one of its axial ends defined as an opening. The cartridge 10 is inserted into the cartridge case 36 from the side by sliding it through the opening.

A cover 40 for the cartridge case 36 is supported at an edge portion 36A of the cartridge case 36 extending along the axial dimension of the concave portion 38 thereof in such a manner that the cover 40 can be opened and/or closed. When the cover 40 is opened, the cartridge 10 can easily be taken out of the concave portion 38 of the cartridge case 36. On the other hand, when the cover 40 is closed, the plush 12A which functions as a shading member of the cartridge body 12 is interposed between the other edge portion 36B of the cartridge case 36 extending along the axial dimension of the concave portion 38 of the cartridge case 36 and an edge portion 40A of the cover 40, thereby fixing the cartridge body 12 in place.

When the cartridge body 12 is fixed in place, the slot 16 of the cartridge body 12 is exposed through the opening in the cartridge case 36 along the edge of the cover. A pair of first pass-rollers 44 for holding the leader 19 therebetween and feeding the same therethrough is disposed near the lower side of the slot 16. The first pass-rollers 44 can be rotated by an unillustrated drive means.

A leader guide 46 for interposing the leader 19 between the first pass-rollers 44 is provided on the side of the cartridge case 36 having the opening of the concave portion 38. The leader guide 46 comprises a leader guide body 48 to which one end of one roller 44A of the first pass-rollers 44 is coupled, and a guide portion 50 to which one end of the other roller 44B of the first pass-rollers 44 is coupled. An arcuate guide gap 51 is defined between the leader guide body 48 and the guide portion 50.

Thus, when the leader 19 is inserted into the guide gap 51 so defined, the leader 19 can easily be held between the pair of first pass-rollers 44.

An unillustrated drive shaft projects from the opening of the concave portion 38 of the cartridge case 36 and also from the end of the cartridge case 36 opposite to this opening, and engages the pawls 22 of the spool 14 of the cartridge 10.

Figure 4:
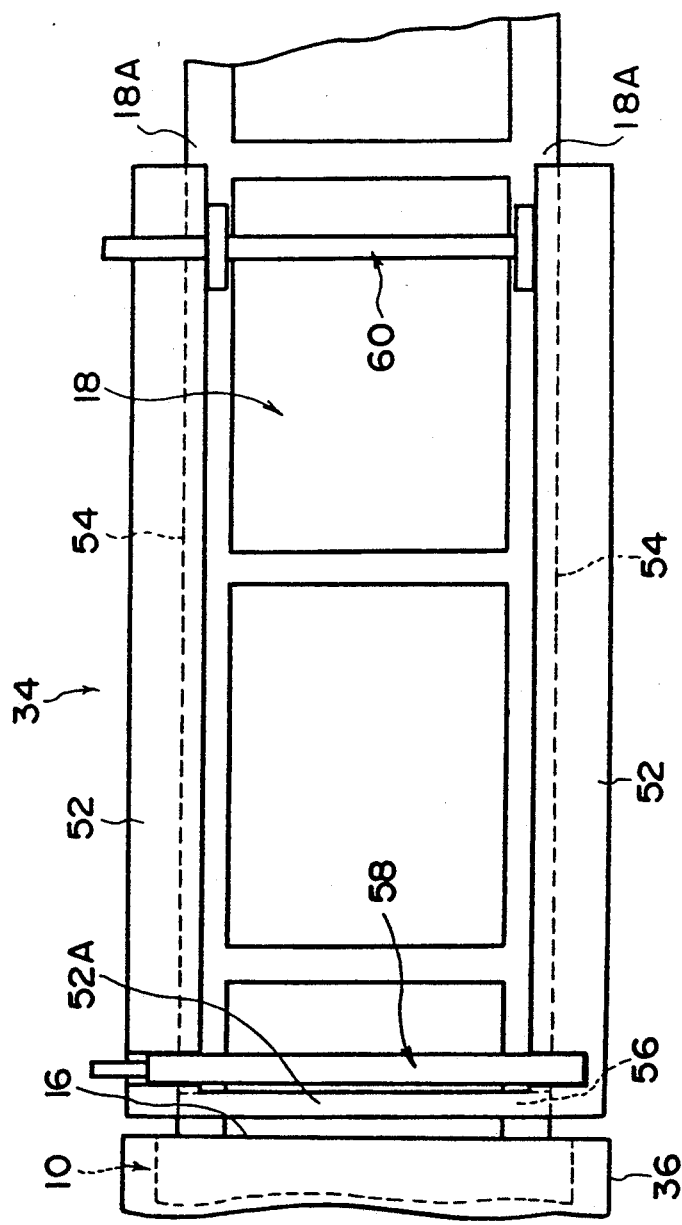
FIG. 4 is a plan view illustrating a guide unit of the cartridge, which is used for the accommodation of the photographic film in the cartridge according to the first embodiment of the first aspect of the present invention.

As illustrated in FIG. 4, the feed guide unit 34 has a pair of feed guides 52 each having one end disposed at respective ends of the slot 16 of the cartridge 10. A side edge portion of the cartridge case 36 is coupled to a bridge portion 52A of the feed guides 52. The feed guides 52 have slender grooves 54 defined in one face thereof, and the two respective grooves face each other. Edge portions 18A of a roll of photographic film 18 are inserted into the slender grooves 54. The bridge portion 52A has slits 56 defined therein through which the photographic film 18 is introduced into the slot 16 of the cartridge 10.

In the vicinity of the bridge portion 52A on the side thereof opposite to the cartridge case 36, a pair of second pass-rollers 58 is disposed in such a position as to hold the photographic film 18 therebetween. The second pass-rollers 58 can be rotated by an unillustrated drive means. In the vicinity of the opposite end of the feed guide unit 34, i.e., the end thereof opposite to the bridge portion 52A, a pair of third pass-rollers 60 is disposed in such a position as to hold the photographic film 18 therebetween. The third pass-rollers 60 can be rotated by an unillustrated drive means.

Figure 5:
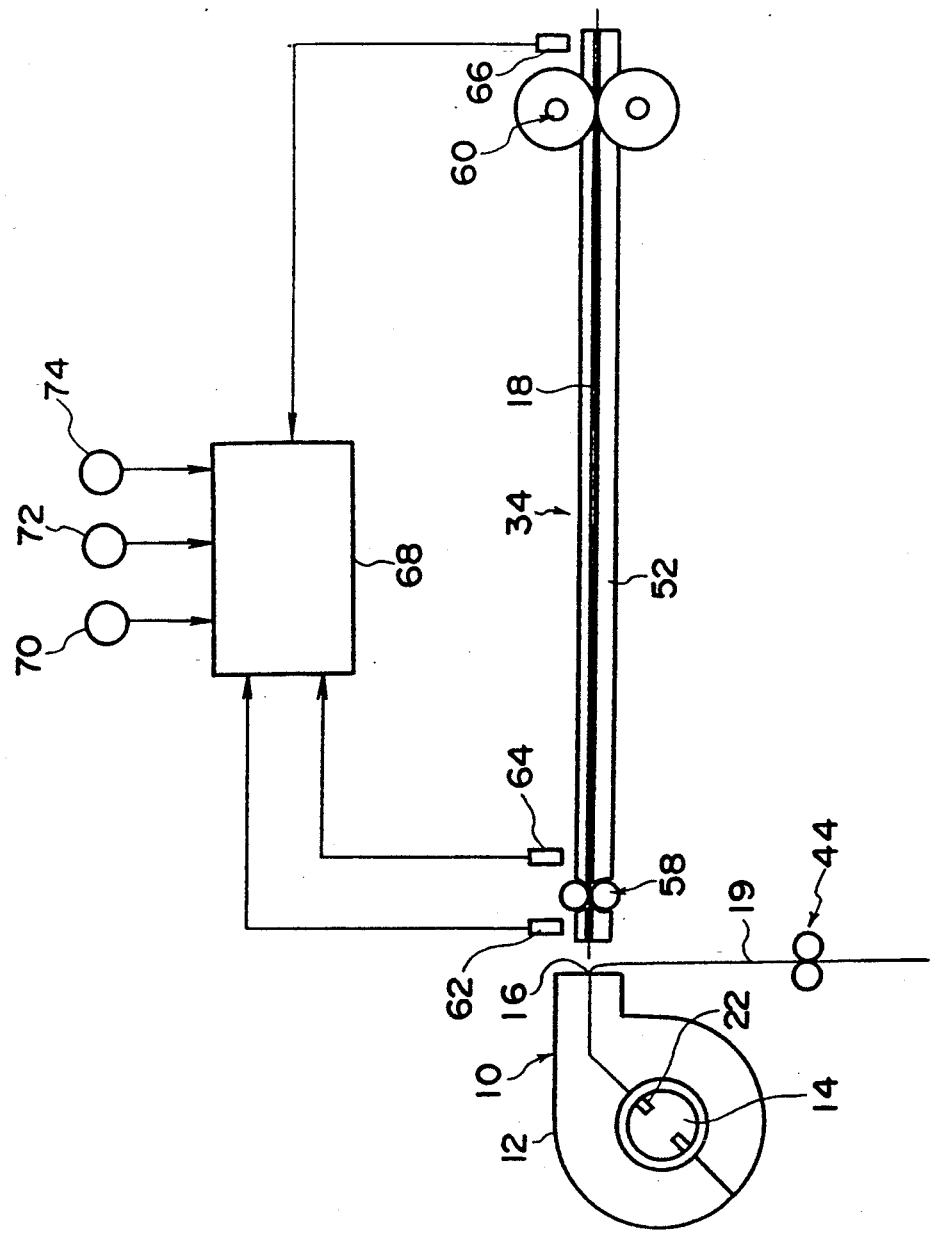
FIG. 5 is a block diagram schematically showing the photographic-film winding device used for the accommodation of the photographic film in the cartridge according to the first embodiment of the first aspect of the present invention.

As depicted in FIG. 5, a first photographic film sensor 62 such as a known photosensor is disposed near the second pass-rollers 58 on the side (left side as seen in FIG. 5) of the bridge portion 52A of the feed guide unit 34. The first photographic film sensor 62 detects whether or not the photographic film 18 is present in a position facing the sensor 62. In addition, a second photographic film sensor 64 such as a known photosensor is disposed near the end (left hand end as seen in FIG. 5) next to the bridge portion 52A of the feed guide portion 34 such that the second pass-rollers 58 are interposed between the first photographic film sensor 62 and the second photographic film sensor 64. The second photographic film sensor 64 detects whether or not the photographic film 18 is present in a position facing the second photographic film sensor 64. Further, a third photographic film sensor 66 such as a known photosensor is provided near the end (right hand end as seen in FIG. 5) of the feed guide portion 34 having the third pass-rollers 60, which is opposite to the end having the bridge portion 52A. The third photographic film sensor 66 detects whether or not the photographic film 18 is present in a position facing the third photographic film sensor 66.

The first, second and third photographic film sensors 62, 64, 66 are respectively connected to a control unit 68 into which a microcomputer is incorporated. Information about the results of the detection of whether or not the photographic film 18 is present in each position is inputted to the control unit 68. In addition, a motor or a clutch coupled to each of the drive shafts of the first pass-rollers 44, the second pass-rollers 58, the third pass-rollers 60 and the spool 14 is connected to the control unit 68, which alternately rotates, stops, and changes the directions of rotation of the drive shafts of the rollers. Furthermore, a torque detector coupled to the first pass-rollers 44, the second pass-rollers 58 and the third pass-rollers 60 is electrically connected to the control unit 68. A signal from the torque detector as to the extent of the torque produced by each of the pass-rollers 44, 58 and 60 is sent to the control unit 68.

A start switch 70 used to start the photographic-film winding device 30, a photographic-film winding start switch 72 used to start the process of winding up a photographic film, and a photographic-film withdrawing start switch 74 used to start the process of withdrawal of the photographic film from the cartridge 10, are electrically connected to the control unit 68.

A detailed description will now be made of a method for accommodating a photographic film in a cartridge according to the present embodiment.

As shown in FIG. 1, when it is desired to perform the process of development of a roll of exposed photographic film wound on the spool 14 and accommodated in the cartridge body 12, the roll of undeveloped photographic film is first withdrawn from the cartridge and cut off at such a point as to leave a predetermined length of the leader 19 projecting from the cartridge body 12, and the roll of photographic film 18 thus cut off is subjected to a development process.

When it is desired to re-contain the so-developed photographic film 18 in the cartridge body 12, the cartridge 10 with the leader 19 projecting from the cartridge body 12 is inserted into the concave portion 38 of the cartridge case 36 from the side by sliding as shown in FIG. 3. At this time, the leader 19 is caused to pass through the guide gap 51 of the leader guide 46 so as to be inserted between the first pass-rollers 44. After the cartridge 10 is inserted into the concave portion 38 of the cartridge case 36, and when the cover 40 is closed and the start switch 70 of the photographic-film winding device 30 is pressed, the first pass-rollers 44 hold the leader 19 therebetween and feed the same in a direction (indicated by the arrow A in FIG. 3) in which it is withdrawn from the cartridge.

When the leader 19 is pulled out to the end, the torque produced by the first pass-rollers 44 becomes larger than a predetermined value. This torque is detected by a torque detector coupled to the first pass-rollers 44 and the result of detection by the torque detector is inputted to the control unit 68. When the torque produced by the first pass-rollers 44 becomes greater than the predetermined value and this state continues for a predetermined period of time, the control unit 68 serves to stop the rotation of the first pass-rollers 44. When this occurs, the leader 19 is gripped by the first pass-rollers 44.

Then, the roll of photographic film 18 whose development processing operations have been completed is mounted on the feed guide unit 34. One of the two ends of the phographic film 18 is inserted into the slender groves 54 of the feed guides 52 from the third pass-rollers 60 end thereof and then pushed against the third pass-rollers 60 end thereof and then pushed against the third pass-rollers 60. When the third photographic film sensor 66 detects the strip of photographic film 18, the control unit 68 serves to rotate each of the second pass-rollers 58 and the third pass-rollers 60 in a direction (indicated by the arrow B in FIG. 3) in which the phototographic film 18 is wound onto the spool 14. As a consequence, the roll of photographic film 18 is held between the third pass-rollers 60 and then fed in the photographic film winding direction.

When the photographic film 18 is detected by the second photographic film sensor 64, the control unit 68 serve to stop the rotation of each of the second pass-rollers 58 and the third pass-rollers 60 and at the same time the photographic film 18 is gripped by the second pass-rollers 58. Thus, the photographic film 18 is caused to stop moving while it is being held by the second pass-rollers 58 and the third pass-rollers 60.

The winding start switch 72 of the photographic-film winding device 30 is then pressed. When the winding start switch 72 is turned on, the control unit 68 serves to rotate each of the second pass-rollers 58 and the third pass-rollers 60 in the direction in which the photographic film 18 is wound onto the spool 14. As a consequence, the roll of photographic film 18 is forced into the slot 16 of the cartridge body 12.

Incidentally, the leading end of the roll of photographic film 18 is forced into the cartridge body 12 until it is brought into abutment against the spool 14. However, the length of the portion of the roll of photographic film 18 which is forced into the cartridge body 12 ranges from 10 mm to 40 mm, and this length can be varied as needed. When the torque produced by either the second pass-rollers 58 or the third pass-rollers 60 exceeds a predetermined value upon forcing the roll of photographic film 18 into the cartridge body, the control unit 68 stops the rotation of each of the second pass-rollers 58 and the third pass-rollers 60. When the torque produced by either the second pass-rollers 58 or the third pass-rollers 60 becomes larger than a predetermined value and such a state continues for a predetermined period of time, indicating that the leading end of the photographic film has not been properly inserted into the cartridge, the control unit 68 serves to reverse the second pass-rollers 58 and the third pass-rollers 60.

When the second pass-rollers 58 and the third pass-rollers 60 are thereby reversed and turn in the opposite direction, the leading end of the roll of photographic film is pulled back from the cartridge, and the first photographic film sensor 62 detects that the photographic film 18 is absent, causing the control unit 68 to rotate each of the second pass-rollers 58 and the third pass-rollers 60 in the direction in which the leading end of the roll of photographic film 18 is again moved along the feed guides in the insertion direction, thereby forcing the photographic film 18 into the slot 16 of the cartridge body 12 again. The process of forcing the photographic film 18 into the slot 16 is performed automatically up to three times. When the roll of photographic film 18 cannot be forced into the slot 16 of the cartridge body 12 even after this process is done three times (i.e., when the torque produced by either the second pass-rollers 58 or the third pass-rollers 60 is greater than a predetermined value three times in a row), the rotation of each of the second pass-rollers 58 and the third pass-rollers 60 is stopped while the roll of photographic film 18 is held between the second pass-rollers 58 and between the third pass-rollers 60.

When a portion of the roll of photographic film 18 is successfully forced into the slot 16 of the cartridge body 12 ranging from 10 mm to 40 mm in length, i.e., when the torque produced by either the second pass-rollers 58 or the third pass-rollers 60 is smaller than the predetermined value while the roll of photographic film 18 is being fed by the second pass-rollers 58 and the third pass-rollers 60 and forced by an amount ranging from 10 mm to 40 mm into the slot 16, the control unit 68 serves to rotate the drive shaft of the spool 14 in the photographic-film winding direction. As a consequence, the leader 19 and the roll of photographic film 18 are wound up on the spool 14.

As illustrated in FIGS. 1 and 2, the roll of photographic film 18 is wound onto the spool 14 from the outward facing side of the leader 19, given that the spool 14 is taken as a base. The photographic film 18 can easily be accommodated in the cartridge body 12 by making use of the frictional force produced between the leader 19 and the photographic film 18.

At this time, the first pass-rollers 44 are still stopped, and the leader 19 is wound on the spool 14 in a state in which back tension is applied thereto. Each of the second pass-rollers 58 and the third pass-rollers 60 can be either rotated or deactivated selectively. Under this condition, the control unit 68 serves to rotate the spool 14 in the photographic-film winding direction through zero to two turns, and thereafter the drive shaft of the spool 14, the first pass-rollers 44, the second pass-rollers 58 and the third pass-rollers 60 are simultaneously rotated, so that the roll of photographic film 18 is wound onto the spool 14 until the leading end of the roll of photographic film 18 is held by the leader 19 or by the leader 19 and the spool 14, with the leader 19 serving as a guide member.

When a predetermined length of the roll of photographic film 18 is wound on the spool 14, the control unit 68 serves to rotate each of the first pass-rollers 44, the second pass-rollers 58 and the third pass-rollers 60 at a rotational speed of 97 to 103 % with respect to the winding speed of roll of photographic film 18 due to the rotation of the spool 14. In other words, the rate at which the rotational speed of each pass-roller exceeds or is less than that of the spool is selected to be within a range of from—3 to 3 %. When the roll of photographic film 18 is fully wound onto the spool 14 in the cartridge body 12 under this condition, by making use of the frictional force produced by holding the leading end thereof between the leader 19 and the spool 14, the first photographic film sensor 62 detects that the roll of photographic film 18 has been fully wound up onto the spool 14. As a consequence, the control unit 68 is activated to stop the rotation of each of the drive shafts of the spool 14, the first pass-rollers 44, the second pass-rollers 58 and the third pass-rollers 60.

The present embodiment has shown and described the case where the rate at which the rotational speed of the pass rollers exceeds or is less than that of the spool, is the same for each pass-roller. However, a one-way clutch may be provided between the drive unit and the pass-rollers so as to enable the second and third pass-rollers to rotate freely in the course of winding of the photographic film 18 on the spool 14.

Incidentally, the photographic-film winding device 30 can be used even in the case where the photographic film 18 in the cartridge body 12 is to be withdrawn.

When the cartridge 10 is mounted in the photographic-film winding device 30 and the photographic-film withdrawal start switch 74 is turned on, the control unit 68 serves to reverse the drive shaft of the spool 14 (rotate the same in the photographic-film withdrawal direction). As a consequence, the leading end of the roll of photographic film 18 is withdrawn from the cartridge body 12, and then inserted into the slender grooves 54 of the feed guide 52. When the first photographic film sensor 62 detects the photographic film 18, the control unit 68 is activated to reverse the second pass-rollers 58 and the third pass-rollers 60 together with the drive shaft of the spool 14, so that the roll of photographic film 18 is withdrawn from the cartridge body 12. Then, when the first photographic film sensor 62 detects the absence of the photographic film 18, the control unit 68 is activated to stop the rotation of each of the drive shafts of the spool 14, the second pass-rollers 58 and the third pass-rollers 60.

A description will now be made of a second embodiment of the first aspect of the present invention with reference to FIGS. 6 and 7.

Incidentally, the same elements of structure as those in the first embodiment will hereinafter be identified by like reference numerals and the description of the elements will therefore be omitted.

Figure 6:
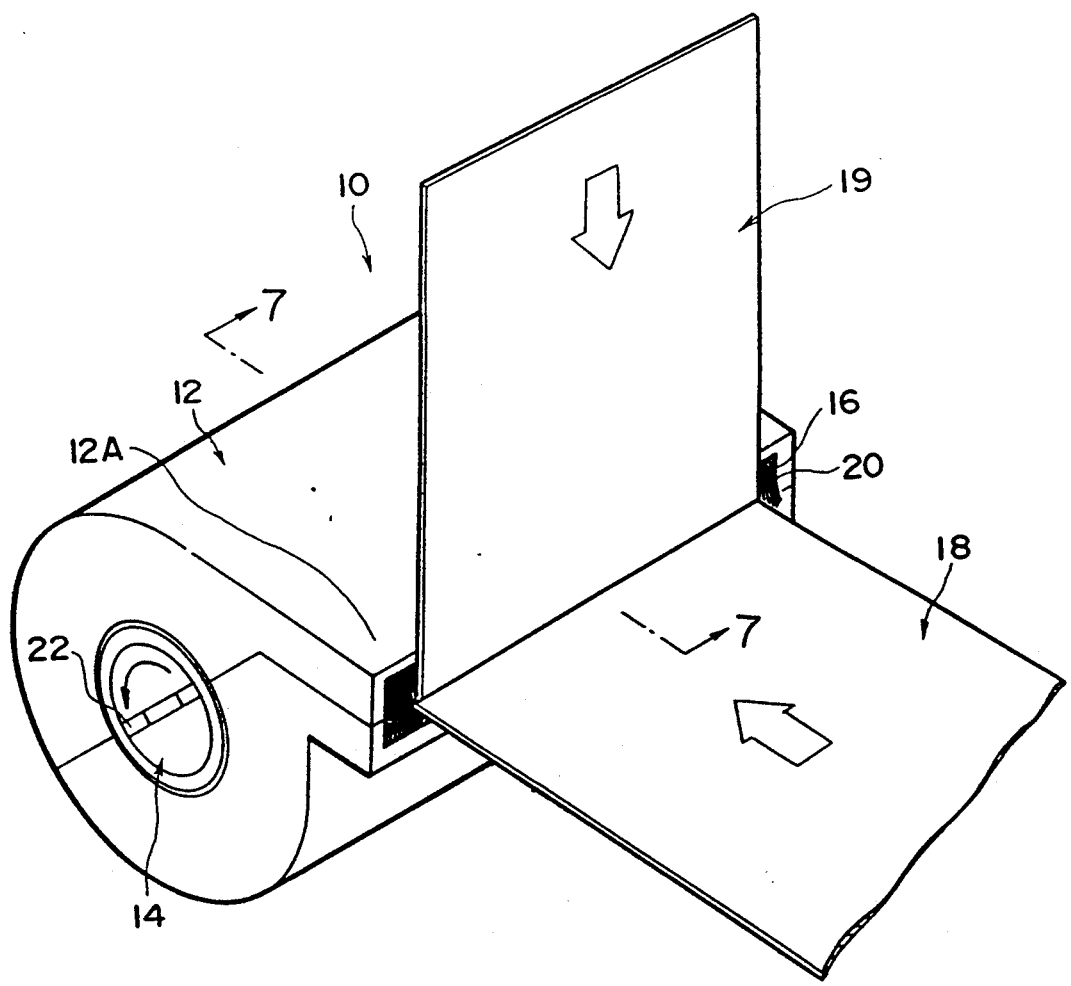
FIG. 6 is a view for describing a method of accommodating a photographic film in a photographic-film cartridge according to a second embodiment of the first aspect of the present invention.
Figure 7:
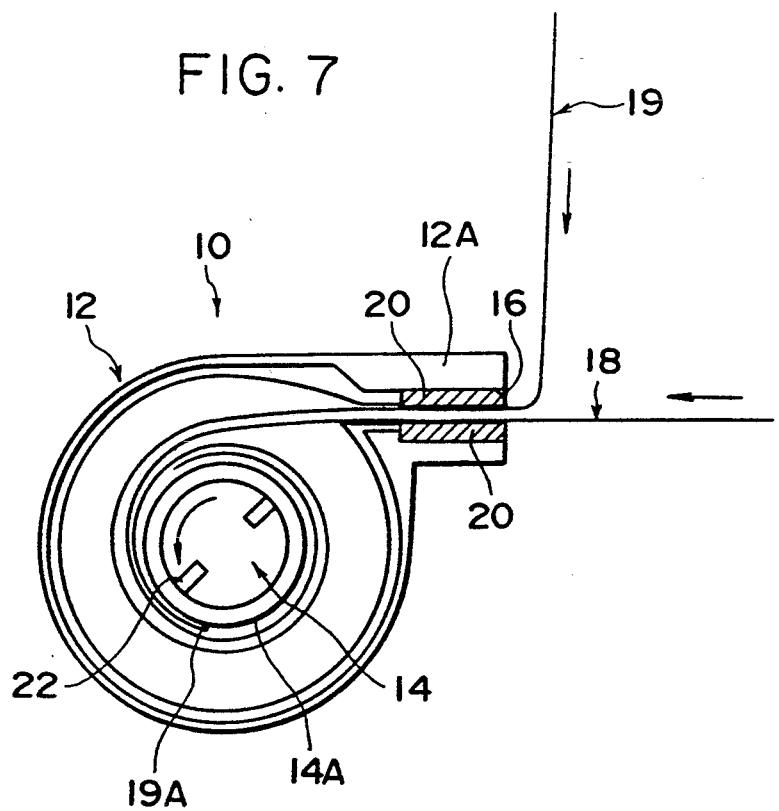
FIG. 7 is a schematic cross-sectional view taken along line 7—7 of FIG. 6.

In the present embodiment as shown in FIGS. 6 and 7, the photographic film 18 which has been cut off and subjected to a development process is wound on the spool 14 while positioned inwardly of the leader 19 (taking the spool 14 as a base) whereby it is accommodated in the cartridge body 12. Thus, the photographic film 18 can be easily accommodated in the cartridge body 12 by making use of the frictional force produced between the leader 19 and the photographic film 18.

Incidentally, the photographic-film winding device 30 used in the present embodiment has a structure of such a type that the first pass-rollers 44 and the leader guide 46 are provided on the side of the cover 40 facing the feed guides 52 (on the upper side in FIG. 5).

One embodiment of a second aspect of the present invention will now be described with reference to FIGS. 8 and 9.

Incidentally, the same elements of structure as those in the first embodiment will hereinafter be identified by like reference numerals and their description will therefore be omitted.

Figure 8:
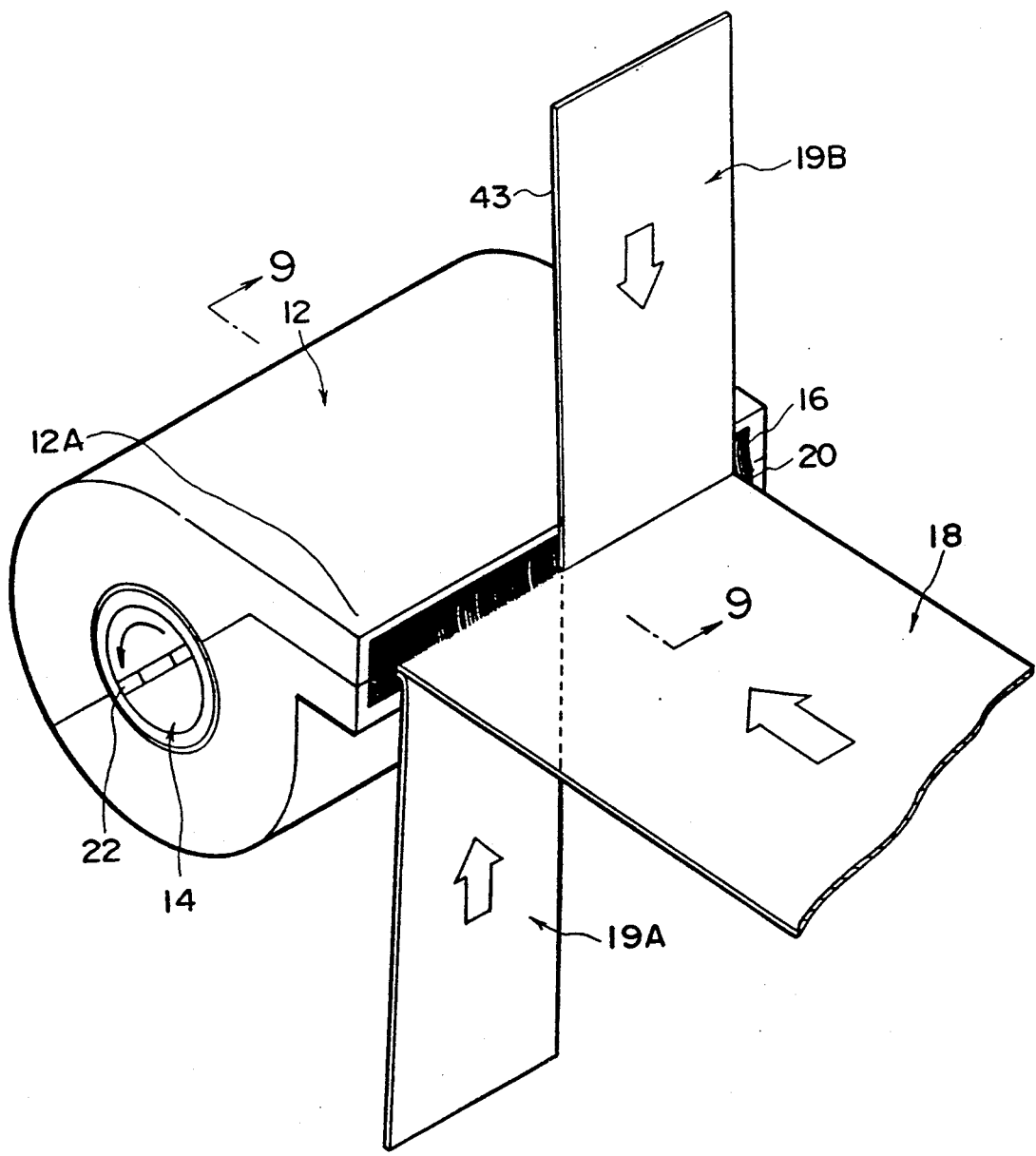
FIG. 8 is a view for describing a method of accommodating a photographic film in a photographic-film cartridge according to an embodiment of a second aspect of the present invention.
Figure 9:
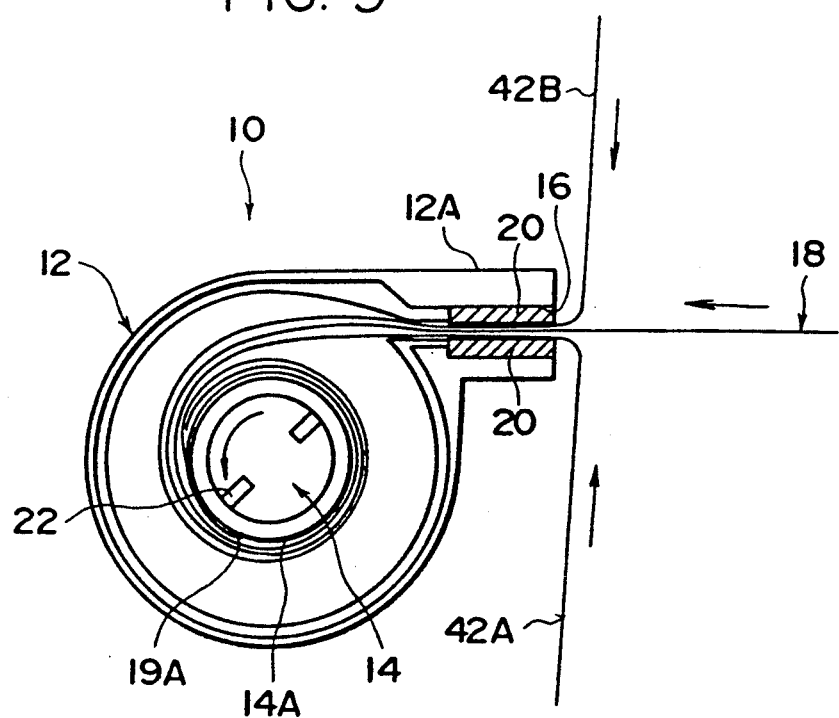
FIG. 9 is a schematic cross-sectional view taken along line 9—9 of FIG. 8.

In the present embodiment, as shown in FIGS. 8 and 9, when it is desired to accommodate the roll of photographic film 18 in the cartridge body 12, a longitudinal slit 43 having a predetermined length and oriented in the leader winding direction is made in the leading end of the leader 19, and the leading end of the leader 19 is thereby divided into one partition 19A and another partition 19B. The partition 19A is disposed inwardly of the leader member with respect to the spool 14 for the photographic film 18, whereas the partition 19B is disposed outwardly of the leader member with respect to the spool 14 for the photographic film 18. Thereafter, the two partitions are wound on the spool 14. Therefore, the photographic film 18 can be easily accommodated in the cartridge body 12 by making use of the frictional force produced among the leader 19, the photographic film 18 and the spool 14.

Incidentally, the slit 43 may be plural. When a plurality of notches 43 are defined, respective partitions of the leader 19 divided by the slits 43 are disposed alternately outwardly and inwardly of the end portion of the photographic film with respect to the spool 14, and they are then wound on the spool 14.

Similarly, the photographic-film winding device 30 employed in the present embodiment also has a structure of such a type that the first pass-rollers 44 and the leader guide 46 are provided on the side of the cover 40 facing the feed guides 52 (on the upper side in FIG. 5).

The above-described embodiment has shown and described a cartridge used for photography. However, the cartridge employed in the present invention is not necessarily limited to a cartridge used for photography. A cartridge having the same mechanism can be prepared for winding a roll of photographic film on a spool in a laboratory process, for example. Such a cartridge can be used in any situation requiring accommodation of photographic film.

According to this invention, as there is no splice on an adhered joint necessary between the leading end of the roll of photographic film and the projecting end of the leader member, the cartridge is not damaged by such a splice rubbing against it, nor is the roll of photographic film damaged by bruising as such a spliced portion is squeezed by the roll of film when it is wound onto the spool.

Having now fully described the invention, it will be apparent to those skilled in the art that many changes and modifications can be made without departing from the spirit or scope of the invention as set forth herein.

What is claimed is:

1. A method of accommodating a strip of photographic film in a main body of a photographic-film cartridge in a state in which a first end of an elongated leader member provided separately from said strip of photographic film is mounted on a spool in said cartridge and a predetermined length of a second end of said elongated leader member extends out of said cartridge, said method comprising the following steps:

a first step of inserting the leading end of a strip of photographic film into said main body of said cartridge through a photographic-film outlet defined in said cartridge such that said photographic film contacts said second end of said elongated leader member extending from said cartridge;

a second step of rotating said spool and feeding said strip of photographic film into said main body of said cartridge with said leader member serving as a guide member for said photographic film, until a leading end of said strip of photographic film is held by successive convolutions of said leader member, or by said leader member and said spool; and a third step of rotating said spool to wind said strip of photographic film onto said spool with the aid of frictional force produced when the leading end of said strip of photographic film is held between consecutive loops of said leader member, and another frictional force produced when said leading end of said strip of photographic film is held between said leader member and said spool, thereby accommodating said strip of photographic film in said main body of said cartridge, and wherein said strip of photographic film is would on said spool from the outward facing said of said leader member, taking said spool as a base.

2. A method according to claim 1, wherein a portion of the leading end of said strip of photographic film having a length ranging from 10 mm to 40 mm is inserted into said main body of said cartridge in said first step.

3. A method according to claim 1, wherein said strip of photographic film is stopped, in said first step, from being inserted into said main body of said cartridge when the feeding torque of said strip of photographic film at the time of its insertion exceeds a predetermined value.

4. A method according to claim 3, wherein said strip of photographic film is moved in a direction opposite to the direction in which said strip of photographic film is inserted into said main body when said state in which said feeding torque exceeds the predetermined value continues for a predetermined period of time.

5. A method according to claim 1, wherein said spool is rotated and said strip of photographic film and said leader member are fed into said main body in said third step.

6. A method according to claim 5, wherein the feed speed of said strip of photographic film and of said leader member is set to a speed within a predetermined range relative to a photographic-film winding speed produced by the rotation of said spool.

7. A method according to claim 1, wherein said spool is rotated so as to wind said leader member thereon under a condition of back tension of said strip of photographic film in said second step.

8. A method according to claim 1, further comprising the following step, as a step for obtaining said elongated leader member, of:

cutting off a portion of said strip of photographic film withdrawn from said cartridge after exposure and before development in a transverse direction and near the proximal, attached end thereof to subject said strip of photographic film to a process of development, thereby leaving a piece of photographic film mounted on said spool, which comprises said elongated leader member.

* * * * *